US008282007B1

(12) United States Patent
Cloutier et al.

(10) Patent No.: US 8,282,007 B1
(45) Date of Patent: Oct. 9, 2012

(54) LAMINATED CARDS WITH MANUAL INPUT INTERFACES

(75) Inventors: Bruce S. Cloutier, Jeanette, PA (US); Jeffrey D. Mullen, Pittsburgh, PA (US)

(73) Assignee: Dynamics Inc., Pittsburgh, PA (US)

( * ) Notice: Subject to any disclaimer, the term of this patent is extended or adjusted under 35 U.S.C. 154(b) by 223 days.

(21) Appl. No.: 12/710,196

(22) Filed: Feb. 22, 2010

Related U.S. Application Data

(60) Provisional application No. 61/247,143, filed on Sep. 30, 2009, provisional application No. 61/234,406, filed on Aug. 17, 2009, provisional application No. 61/220,501, filed on Jun. 25, 2009, provisional application No. 61/166,909, filed on Apr. 6, 2009.

(51) Int. Cl.
*G06K 19/02* (2006.01)

(52) U.S. Cl. ......................... 235/488; 235/451; 235/492

(58) Field of Classification Search .................. 235/488, 235/492, 451, 449
See application file for complete search history.

(56) References Cited

U.S. PATENT DOCUMENTS 4,353,064 A 10/1982 Stamm
4,394,654 A 7/1983 Hofmann-Cerfontaine
4,614,861 A 9/1986 Pavlov et al.
4,667,087 A 5/1987 Quintana
4,701,601 A 10/1987 Francini et al.
4,720,860 A 1/1988 Weiss
4,786,791 A 11/1988 Hodama
4,791,283 A 12/1988 Burkhardt
4,797,542 A 1/1989 Hara
5,038,251 A 8/1991 Sugiyama et al.
5,168,520 A 12/1992 Weiss
5,237,614 A 8/1993 Weiss
5,276,311 A 1/1994 Hennige
5,347,580 A 9/1994 Molva et al.
5,361,062 A 11/1994 Weiss et al.
5,412,199 A 5/1995 Finkelstein et al.
5,434,398 A 7/1995 Goldberg
5,434,405 A 7/1995 Finkelstein et al.
5,478,994 A 12/1995 Rahman
5,479,512 A 12/1995 Weiss
5,484,997 A 1/1996 Haynes
5,485,519 A 1/1996 Weiss
5,585,787 A 12/1996 Wallerstein
5,591,949 A 1/1997 Bernstein
5,608,203 A 3/1997 Finkelstein et al.
5,623,552 A 4/1997 Lane
5,657,388 A 8/1997 Weiss
5,834,747 A 11/1998 Cooper
5,834,756 A 11/1998 Gutman et al.
5,856,661 A 1/1999 Finkelstein et al.

(Continued)

FOREIGN PATENT DOCUMENTS

JP 05210770 A 8/1993

(Continued)

OTHER PUBLICATIONS

The Bank Credit Card Business. Second Edition, American Bankers Association, Washington, D.C., 1996.

(Continued)

*Primary Examiner* — Ahshik Kim

(57) ABSTRACT

A laminated card is provided with manual input interfaces. Such manual input interfaces may provide tactile feedback to a user. Laminated cards may be provided as payment cards, identification cards, medical cards, or any other type of card.

20 Claims, 11 Drawing Sheets

U.S. PATENT DOCUMENTS

| | | | |
|---|---|---|---|
| 5,864,623 | A | 1/1999 | Messina et al. |
| 5,907,142 | A | 5/1999 | Kelsey |
| 5,913,203 | A | 6/1999 | Wong et al. |
| 5,937,394 | A | 8/1999 | Wong et al. |
| 5,955,021 | A | 9/1999 | Tiffany, III |
| 5,956,699 | A | 9/1999 | Wong et al. |
| 6,025,054 | A | 2/2000 | Tiffany, III |
| 6,045,043 | A | 4/2000 | Bashan et al. |
| 6,076,163 | A | 6/2000 | Hoffstein et al. |
| 6,085,320 | A | 7/2000 | Kaliski |
| 6,095,416 | A | 8/2000 | Grant et al. |
| 6,130,621 | A | 10/2000 | Weiss |
| 6,145,079 | A | 11/2000 | Mitty et al. |
| 6,157,920 | A | 12/2000 | Jakobsson et al. |
| 6,161,181 | A | 12/2000 | Haynes, III et al. |
| 6,176,430 | B1 | 1/2001 | Finkelstein et al. |
| 6,182,894 | B1 | 2/2001 | Hackett et al. |
| 6,189,098 | B1 | 2/2001 | Kaliski |
| 6,199,052 | B1 | 3/2001 | Mitty et al. |
| 6,206,293 | B1 | 3/2001 | Gutman et al. |
| 6,240,184 | B1 | 5/2001 | Huynh et al. |
| 6,241,153 | B1 | 6/2001 | Tiffany, III |
| 6,256,873 | B1 | 7/2001 | Tiffany, III |
| 6,269,163 | B1 | 7/2001 | Rivest et al. |
| 6,286,022 | B1 | 9/2001 | Kaliski et al. |
| 6,308,890 | B1 | 10/2001 | Cooper |
| 6,313,724 | B1 | 11/2001 | Osterweil |
| 6,389,442 | B1 | 5/2002 | Yin et al. |
| 6,393,447 | B1 | 5/2002 | Jakobsson et al. |
| 6,411,715 | B1 | 6/2002 | Liskov et al. |
| 6,446,052 | B1 | 9/2002 | Juels |
| 6,460,141 | B1 | 10/2002 | Olden |
| 6,592,044 | B1 | 7/2003 | Wong et al. |
| 6,607,127 | B2 | 8/2003 | Wong |
| 6,609,654 | B1 | 8/2003 | Anderson et al. |
| 6,631,849 | B2 | 10/2003 | Blossom |
| 6,644,551 | B2 * | 11/2003 | Clayman et al. .............. 235/488 |
| 6,655,585 | B2 | 12/2003 | Shinn |
| 6,681,988 | B2 | 1/2004 | Stack et al. |
| 6,705,520 | B1 | 3/2004 | Pitroda et al. |
| 6,755,341 | B1 | 6/2004 | Wong et al. |
| 6,764,005 | B2 | 7/2004 | Cooper |
| 6,769,618 | B1 | 8/2004 | Finkelstein |
| 6,805,288 | B2 | 10/2004 | Routhenstein et al. |
| 6,811,082 | B2 | 11/2004 | Wong |
| 6,813,354 | B1 | 11/2004 | Jakobsson et al. |
| 6,817,532 | B2 | 11/2004 | Finkelstein |
| 6,873,974 | B1 | 3/2005 | Schutzer |
| 6,902,116 | B2 | 6/2005 | Finkelstein |
| 6,970,070 | B2 | 11/2005 | Juels et al. |
| 6,980,969 | B1 | 12/2005 | Tuchler et al. |
| 6,985,583 | B1 | 1/2006 | Brainard et al. |
| 6,991,155 | B2 | 1/2006 | Burchette, Jr. |
| 7,013,030 | B2 | 3/2006 | Wong et al. |
| 7,035,443 | B2 | 4/2006 | Wong |
| 7,039,223 | B2 | 5/2006 | Wong |
| 7,044,394 | B2 | 5/2006 | Brown |
| 7,051,929 | B2 | 5/2006 | Li |
| 7,083,094 | B2 | 8/2006 | Cooper |
| 7,100,049 | B2 | 8/2006 | Gasparini et al. |
| 7,100,821 | B2 | 9/2006 | Rasti |
| 7,111,172 | B1 | 9/2006 | Duane et al. |
| 7,114,652 | B2 | 10/2006 | Moullette et al. |
| 7,136,514 | B1 | 11/2006 | Wong |
| 7,140,550 | B2 | 11/2006 | Ramachandran |
| 7,163,153 | B2 | 1/2007 | Blossom |
| 7,195,154 | B2 | 3/2007 | Routhenstein |
| 7,197,639 | B1 | 3/2007 | Juels et al. |
| 7,219,368 | B2 | 5/2007 | Juels et al. |
| 7,225,537 | B2 | 6/2007 | Reed |
| 7,225,994 | B2 | 6/2007 | Finkelstein |
| 7,246,752 | B2 | 7/2007 | Brown |
| 7,298,243 | B2 | 11/2007 | Juels et al. |
| 7,334,732 | B2 | 2/2008 | Cooper |
| 7,337,326 | B2 | 2/2008 | Palmer et al. |
| 7,346,775 | B2 | 3/2008 | Gasparinl et al. |
| 7,356,696 | B1 | 4/2008 | Jakobsson et al. |
| 7,357,319 | B1 | 4/2008 | Liu et al. |
| 7,359,507 | B2 | 4/2008 | Kaliski |
| 7,360,688 | B1 | 4/2008 | Harris |
| 7,363,494 | B2 | 4/2008 | Brainard et al. |
| 7,380,710 | B2 | 6/2008 | Brown |
| 7,398,253 | B1 | 7/2008 | Pinnell |
| 7,404,087 | B2 | 7/2008 | Teunen |
| 7,424,570 | B2 | 9/2008 | D'Albore et al. |
| 7,427,033 | B1 | 9/2008 | Roskind |
| 7,454,349 | B2 | 11/2008 | Teunen et al. |
| 7,461,250 | B1 | 12/2008 | Duane et al. |
| 7,461,399 | B2 | 12/2008 | Juels et al. |
| 7,472,093 | B2 | 12/2008 | Juels |
| 7,472,829 | B2 | 1/2009 | Brown |
| 7,494,055 | B2 | 2/2009 | Fernandes et al. |
| 7,502,467 | B2 | 3/2009 | Brainard et al. |
| 7,502,933 | B2 | 3/2009 | Jakobsson et al. |
| 7,503,485 | B1 | 3/2009 | Routhenstein |
| 7,516,492 | B1 | 4/2009 | Nisbet et al. |
| 7,523,301 | B2 | 4/2009 | Nisbet et al. |
| 7,530,495 | B2 | 5/2009 | Cooper |
| 7,532,104 | B2 | 5/2009 | Juels |
| 7,543,739 | B2 | 6/2009 | Brown et al. |
| 7,559,464 | B2 | 7/2009 | Routhenstein |
| 7,562,221 | B2 | 7/2009 | Nystrom et al. |
| 7,562,222 | B2 | 7/2009 | Gasparini et al. |
| 7,580,898 | B2 | 8/2009 | Brown et al. |
| 7,584,153 | B2 | 9/2009 | Brown et al. |
| 7,591,426 | B2 | 9/2009 | Osterweil et al. |
| 7,591,427 | B2 | 9/2009 | Osterweil |
| 7,602,904 | B2 | 10/2009 | Juels et al. |
| 7,631,804 | B2 | 12/2009 | Brown |
| 7,639,537 | B2 | 12/2009 | Sepe et al. |
| 7,641,124 | B2 | 1/2010 | Brown et al. |
| 7,660,902 | B2 | 2/2010 | Graham et al. |
| 7,828,207 | B2 | 11/2010 | Cooper |
| 2001/0034702 | A1 | 10/2001 | Mockett et al. |
| 2001/0047335 | A1 | 11/2001 | Arndt et al. |
| 2002/0059114 | A1 | 5/2002 | Cockrill et al. |
| 2002/0082989 | A1 | 6/2002 | Fife et al. |
| 2002/0096570 | A1 | 7/2002 | Wong et al. |
| 2002/0120583 | A1 | 8/2002 | Keresman, III et al. |
| 2003/0034388 | A1 | 2/2003 | Routhenstein et al. |
| 2003/0052168 | A1 | 3/2003 | Wong |
| 2003/0057278 | A1 | 3/2003 | Wong |
| 2003/0116635 | A1 | 6/2003 | Taban |
| 2003/0152253 | A1 | 8/2003 | Wong |
| 2003/0163287 | A1 | 8/2003 | Vock et al. |
| 2003/0173409 | A1 | 9/2003 | Vogt et al. |
| 2003/0179909 | A1 | 9/2003 | Wong et al. |
| 2003/0179910 | A1 | 9/2003 | Wong |
| 2003/0226899 | A1 * | 12/2003 | Finkelstein ................... 235/492 |
| 2004/0035942 | A1 | 2/2004 | Silverman |
| 2004/0133787 | A1 | 7/2004 | Doughty |
| 2004/0162732 | A1 | 8/2004 | Rahim et al. |
| 2004/0172535 | A1 | 9/2004 | Jakobsson |
| 2004/0177045 | A1 | 9/2004 | Brown |
| 2005/0043997 | A1 | 2/2005 | Sahota et al. |
| 2005/0080747 | A1 | 4/2005 | Anderson et al. |
| 2005/0086160 | A1 | 4/2005 | Wong et al. |
| 2005/0086177 | A1 | 4/2005 | Anderson et al. |
| 2005/0116026 | A1 | 6/2005 | Burger et al. |
| 2005/0119940 | A1 | 6/2005 | Concilio et al. |
| 2005/0154643 | A1 | 7/2005 | Doan et al. |
| 2005/0228959 | A1 | 10/2005 | D'Albore et al. |
| 2006/0000900 | A1 | 1/2006 | Fernandes et al. |
| 2006/0037073 | A1 | 2/2006 | Juels et al. |
| 2006/0041759 | A1 | 2/2006 | Kaliski et al. |
| 2006/0085328 | A1 | 4/2006 | Cohen et al. |
| 2006/0091223 | A1 | 5/2006 | Zellner |
| 2006/0161435 | A1 | 7/2006 | Atef et al. |
| 2006/0163353 | A1 | 7/2006 | Moulette et al. |
| 2006/0174104 | A1 | 8/2006 | Crichton et al. |
| 2006/0196931 | A1 | 9/2006 | Holtmanns et al. |
| 2006/0256961 | A1 | 11/2006 | Brainard et al. |
| 2006/0289657 | A1 * | 12/2006 | Rosenberg .................... 235/492 |
| 2007/0034700 | A1 | 2/2007 | Poidomani et al. |
| 2007/0114274 | A1 | 5/2007 | Gibbs et al. |
| 2007/0124321 | A1 | 5/2007 | Szydlo |
| 2007/0152070 | A1 | 7/2007 | D'Albore |

2007/0152072 A1 7/2007 Frallicciardi et al.
2007/0153487 A1 7/2007 Frallicciardi et al.
2007/0174614 A1 7/2007 Duane et al.
2007/0192249 A1 8/2007 Biffle et al.
2007/0241183 A1* 10/2007 Brown et al. ................ 235/380
2007/0241201 A1 10/2007 Brown et al.
2007/0256123 A1 11/2007 Duane et al.
2007/0291753 A1 12/2007 Romano
2008/0005510 A1 1/2008 Sepe et al.
2008/0008315 A1 1/2008 Fontana et al.
2008/0008322 A1 1/2008 Fontana et al.
2008/0010675 A1 1/2008 Massascusa et al.
2008/0016351 A1 1/2008 Fontana et al.
2008/0019507 A1 1/2008 Fontana et al.
2008/0028447 A1 1/2008 O'Malley et al.
2008/0040271 A1 2/2008 Hammad et al.
2008/0040276 A1 2/2008 Hammad et al.
2008/0058016 A1 3/2008 Di Maggio et al.
2008/0059379 A1 3/2008 Ramaci et al.
2008/0096326 A1 4/2008 Reed
2008/0126398 A1 5/2008 Cimino
2008/0128515 A1 6/2008 Di Iorio
2008/0148394 A1 6/2008 Poidomani et al.
2008/0201264 A1 8/2008 Brown et al.
2008/0209550 A1 8/2008 Di Iorio
2008/0288699 A1 11/2008 Chichierchia
2008/0294930 A1 11/2008 Varone et al.
2008/0302877 A1 12/2008 Musella et al.
2009/0013122 A1 1/2009 Sepe et al.
2009/0036147 A1 2/2009 Romano
2009/0046522 A1 2/2009 Sepe et al.
2009/0108064 A1 4/2009 Fernandes et al.
2009/0150295 A1 6/2009 Hatch et al.
2009/0152365 A1 6/2009 Li et al.
2009/0242648 A1 10/2009 Di Sirio et al.
2009/0244858 A1 10/2009 Di Sirio et al.
2009/0253460 A1 10/2009 Varone et al.
2009/0255996 A1 10/2009 Brown et al.
2009/0290704 A1 11/2009 Cimino
2009/0303885 A1 12/2009 Longo
2011/0028184 A1 2/2011 Cooper

FOREIGN PATENT DOCUMENTS

WO WO9852735 11/1998
WO WO0247019 6/2002
WO WO2006066322 6/2006
WO WO2006080929 8/2006
WO WO2006105092 10/2006
WO WO2006116772 11/2006
WO WO2008064403 6/2008

OTHER PUBLICATIONS

A Day in the Life of a Flux Reversal. http://www.phrack/org/issues.html?issue=37&id=6#article. As viewed on Apr. 12, 2010.
Dynamic Virtual Credit Card Numbers. http://homes.cerias.purdue.edu/~jtli/paper/fc07.pdf. As viewed on Apr. 12, 2010.
English translation of JP 05210770 A.
U.S. Appl. No. 60/594,300, Poidomani et al.
U.S. Appl. No. 60/675,388, Poidomani et al.

* cited by examiner

DYNAMIC MAGNETIC STRIPE COMMUNICATIONS DEVICE
Dynamic Card No.
Dynamic Code
1234 - 5678
- 90123 - 4567
890
A (0,1)
B (2,3)
C (4,5)
D (6,7)
E (8,9)
NAME: JEFFREY_MULLEN_S32S
100
101
111
112
113
120
125
130
131
132
133
134
135
Battery
Display
PROCESSOR
DRIVING CIRCUITRY
Memory
RFID
IC Chip
Read Head Detect
Read Head Detect
140
141
142
143
150
151
170
171
172
180
185
190
192

600

800

900

1000

1100

LAMINATED CARDS WITH MANUAL INPUT INTERFACES

CROSS-REFERENCE TO RELATED APPLICATIONS

This application claims the benefit of U.S. Provisional Patent Application Nos. 61/166,909 filed on Apr. 6, 2009, 61/220,501 filed on Jun. 25, 2009, 61/234,406 filed on Aug. 17, 2009, and 61/247,143 filed on Sep. 30, 2009, all of which are hereby incorporated by reference herein in their entirety.

BACKGROUND OF THE INVENTION

This invention relates to magnetic cards and devices and associated payment systems.

SUMMARY OF THE INVENTION

A card may include a dynamic magnetic communications device. Such a dynamic magnetic communications device may take the form of a magnetic encoder or a magnetic emulator. A magnetic encoder may change the information located on a magnetic medium such that a magnetic stripe reader may read changed magnetic information from the magnetic medium. A magnetic emulator may generate electromagnetic fields that directly communicate data to a magnetic stripe reader. Such a magnetic emulator may communicate data serially to a read-head of the magnetic stripe reader.

All, or substantially all, of the front as well as the back of a card may be a display (e.g., bi-stable, non bi-stable, LCD, or electrochromic display). Electrodes of a display may be coupled to one or more capacitive touch sensors such that a display may be provided as a touch-screen display. Any type of touch-screen display may be utilized. Such touch-screen displays may be operable of determining multiple points of touch.

Laminated cards, such as payment cards, identification cards, or medical cards, are provided any may be laminated in a variety of ways. For example, a card may be laminated by applying multiple sheets of laminate over each other and then fixing these sheets together via pressure and temperature. Cavities may be formed by creating apertures in each individual sheets. Components of a card may be placed in these apertures (e.g., dynamic magnetic stripe communications devices). Manual input interfaces (e.g., mechanical buttons and capacitive sensors) may be placed on different layers such that such manual input interfaces are closer to a particular surface of a card. Apertures may be made between any two layers of a card and any component (e.g., dynamic magnetic stripe communications devices or mechanical buttons) may be placed in such apertures.

A soft laminate that later hardens may be placed over the exterior layers of such multiple-layer laminates in order to provide smooth exterior surfaces.

As per another example, lamination may be provided where a soft material (e.g., a liquid) is injected between two polymer layers. The soft material may harden between the two layers. For example, the soft material may react with another material (e.g., a second soft material injected between the layers) to harder. Accordingly, the electrical components of a card may be completely surrounded and immersed by such one or more soft materials (e.g., one or more liquids) such that that the stability of the card is increased after the soft materials harden. In providing a soft laminate (e.g., a liquid) that hardens, the soft material may be provided between components that may otherwise not be protected if an aperture is cut into layers. Accordingly, additional laminate may be placed into a card—thus increasing the structural stability of the card.

Manual user interfaces may be provided in cavities. In doing so, for example, the manual user interfaces may be protected from the lamination process. Furthermore, the manual user interfaces may be more sensitive to receiving manual input.

Methods for forming cavities are provided. For example, a cylindrical material having a manual user interface inside the cylinder may be adhered at each end to a polymer layer. A soft laminate may then be injected between the layers to form a card. This soft laminate may then harden. The cylinder may, for example, provide an enclosed cavity such that the soft laminate does not enter into the cavity.

Numerous manual input interfaces are provided. For example, manual input interfaces are provided that are mechanical switches (e.g., dome switches and/or piezoelectric switches), capacitive switches (e.g., capacitive touch sensors), and light switches (e.g., light sensors).

Systems and methods are provided in order to increase the sensitivity of various types of switches inside of laminated cards.

BRIEF DESCRIPTION OF THE DRAWINGS

The principles and advantages of the present invention can be more clearly understood from the following detailed description considered in conjunction with the following drawings, in which the same reference numerals denote the same structural elements throughout, and in which.

DETAILED DESCRIPTION OF THE INVENTION

Figure 1:
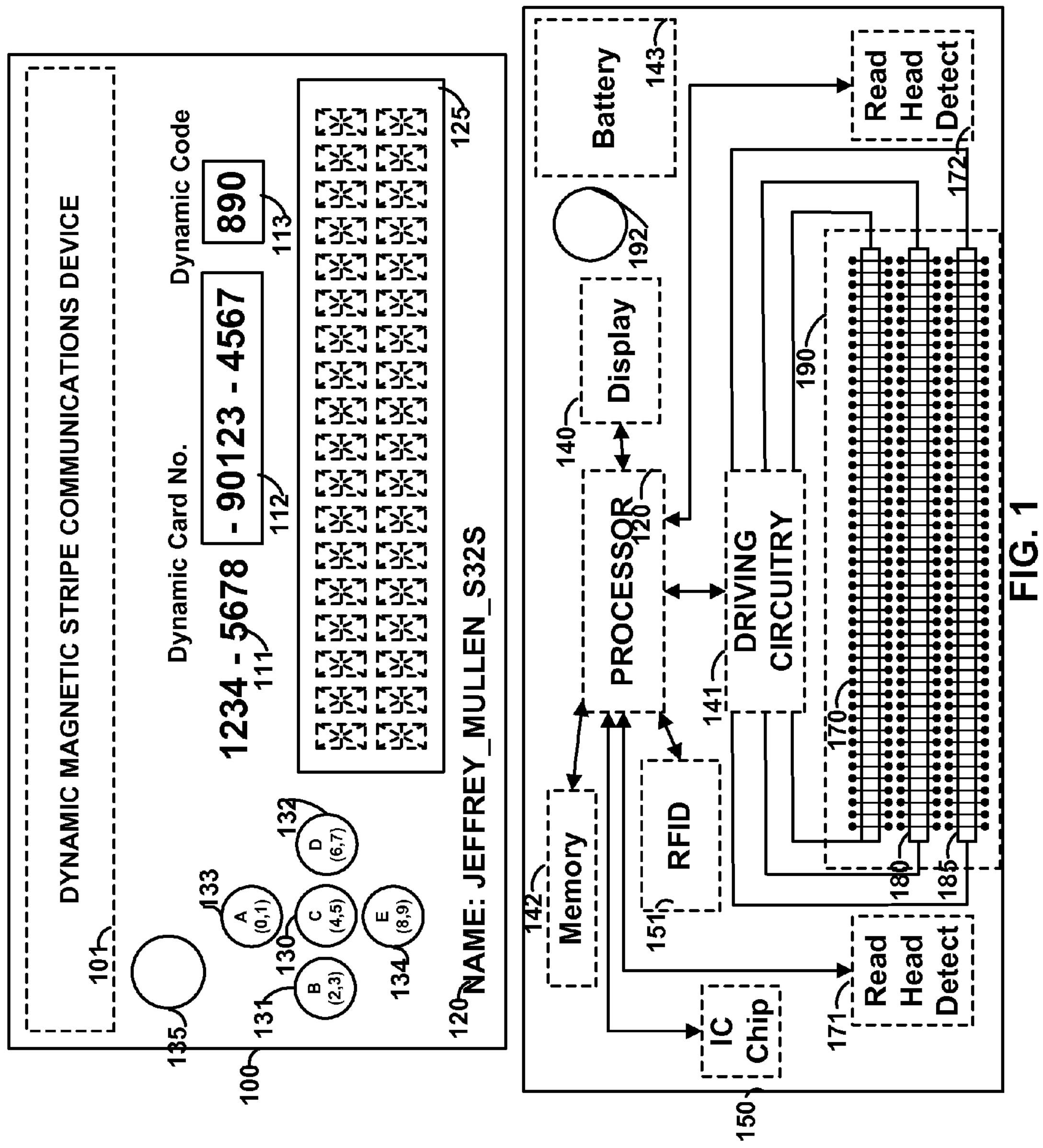
FIG. 1 is an illustration of cards constructed in accordance with the principles of the present invention.

FIG. 1 shows card 100 that may include, for example, a dynamic number that may be entirely, or partially, displayed via display 112. A dynamic number may include a permanent portion such as, for example, permanent portion 111. Permanent portion 111 may be printed as well as embossed or laser etched on card 100. Multiple displays may be provided on a card. For example, display 113 may be utilized to display a dynamic code such as a dynamic security code. Display 125 may also be provided to display logos, barcodes, or multiple lines of information. A display may be a bi-stable display or non bi-stable display. Permanent information 120 may also be included and may include information such as information specific to a user (e.g., a user's name or username) or information specific to a card (e.g., a card issue date and/or a card expiration date). Card 100 may include one or more buttons such as buttons 130-134. Such buttons may be mechanical buttons, capacitive buttons, or a combination or mechanical and capacitive buttons. Manual input interface 135 may be provided. Manual input interface 135 may include a cavity that includes a switch inside of the cavity. Card 100 may be provided by placing the electronics of card 100 between two polymer sheets and injecting one or more liquid laminates that harden within a particular period of time. For example, the one or more liquid laminates may react with each other, the environment (e.g., air), or another variable (e.g., temperature) to harden.

Architecture 150 may be utilized with any card. Architecture 150 may include processor 120. Processor 120 may have on-board memory for storing information (e.g., application code). Any number of components may communicate to processor 120 and/or receive communications from processor 120. For example, one or more displays (e.g., display 140) may be coupled to processor 120. Persons skilled in the art will appreciate that components may be placed between particular components and processor 120. For example, a display driver circuit may be coupled between display 140 and processor 120. Memory 142 may be coupled to processor 120. Memory 142 may include data that is unique to a particular card. For example, memory 142 may include a user-specific and card-specific data (e.g., name and/or account number).

Any number of reader communication devices may be included in architecture 150. For example, IC chip 150 may be included to communicate information to an IC chip reader. IC chip 150 may be, for example, an EMV chip. As per another example, RFID 151 may be included to communicate information to an RFID reader. A magnetic stripe communications device may also be included to communicate information to a magnetic stripe reader. Such a magnetic stripe communications device may provide electromagnetic signals to a magnetic stripe reader. Different electromagnetic signals may be communicated to a magnetic stripe reader to provide different tracks of data. For example, electromagnetic field generators 170, 180, and 185 may be included to communicate separate tracks of information to a magnetic stripe reader. Such electromagnetic field generators may include a coil wrapped around one or more materials (e.g., a soft-magnetic material and a non-magnetic material). Each electromagnetic field generator may communicate information serially to a receiver of a magnetic stripe reader for particular magnetic stripe track. Read-head detectors 171 and 172 may be utilized to sense the presence of a magnetic stripe reader (e.g., a read-head housing of a magnetic stripe reader). This sensed information may be communicated to processor 120 to cause processor 120 to communicate information serially from electromagnetic generators 170, 180, and 185 to magnetic stripe track receivers in a read-head housing of a magnetic stripe reader. Accordingly, a magnetic stripe communications device may change the information communicated to a magnetic stripe reader at any time. Processor 120 may, for example, communicate user-specific and card-specific information through RFID 151, IC chip 150, and electromagnetic generators 170, 180, and 185 to card readers coupled to remote information processing servers (e.g., purchase authorization servers). Driving circuitry 141 may be utilized by processor 120, for example, to control electromagnetic generators 170, 180, and 185. Manual input interface 192 may be provided. Manual input interface 192, or any manual input interface, may include a cavity that includes a switch inside of the cavity.

Figure 2:
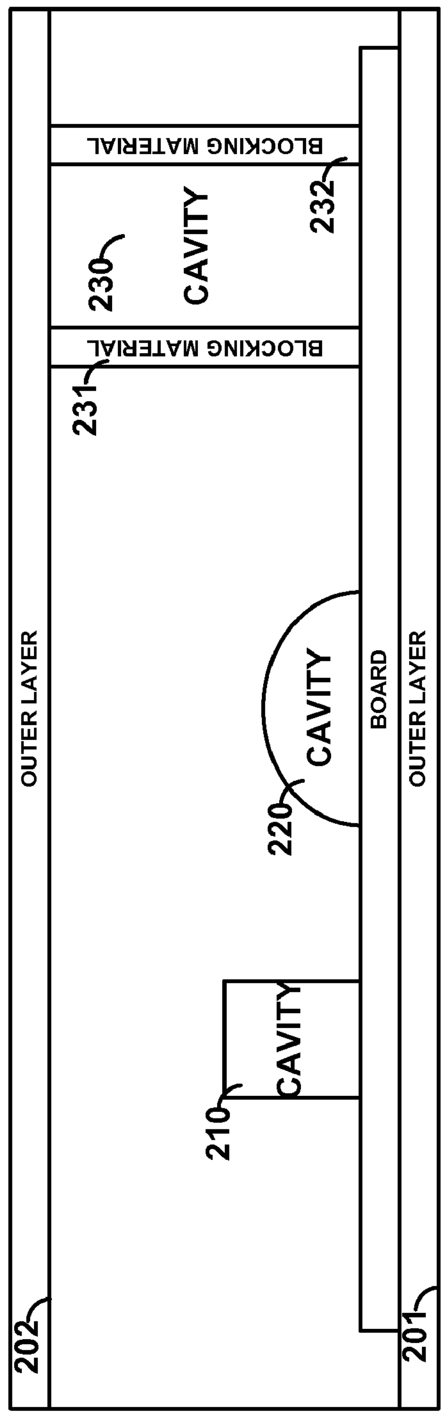
FIG. 2 is an illustration of a card having manual input interfaces constructed in accordance with the principles of the present invention.

FIG. 2 shows cavities 210, 220, and 230. A cavity may be provided in a variety of shapes. For example, a cavity may take a cylindrical, cubical, tetrahedron, prism, cone, pyramid, spherical, semi-spherical form, or any other three-dimensional shape (e.g., a three-dimensional rectangle). Cavities may be formed in multiple ways. For example, cavities may be cut into a card. A card may be cut (e.g., etched or grinded) to a particular depth to form a cavity. One or more electrical connections may be provided at that depth so when the card is cut, the electrical connections are exposed. Components may be added to the cavity to form a mechanical button using the exposed components. For example, a dome may be provided with a contact on top of the interior of the dome that bridges two electrical contacts exposed at the button of the cut card. Accordingly, a user pressing down on the dome would connect the two conductive contacts and allow an electrical signal to pass. A cover may then be placed over the dome or, for example, the space above the dome may be filled with one or more soft laminates that later harden to provide a hard laminate.

Cavities may be formed while the card is being formed. More particularly, a material may be placed (e.g., materials 231 and 232) to form a cavity by prohibiting laminate material from getting inside of the cavity. Accordingly, for example, one or more soft laminate materials may be injected between layers 202 and 201 and be blocked by materials 231 and 232 from entering cavity 230. Manual input interfaces may be placed in cavities. For example, a dome switch may be provided in the cavity. A cavity may also take the shape of a cube or rectangular prism.

Figure 3:
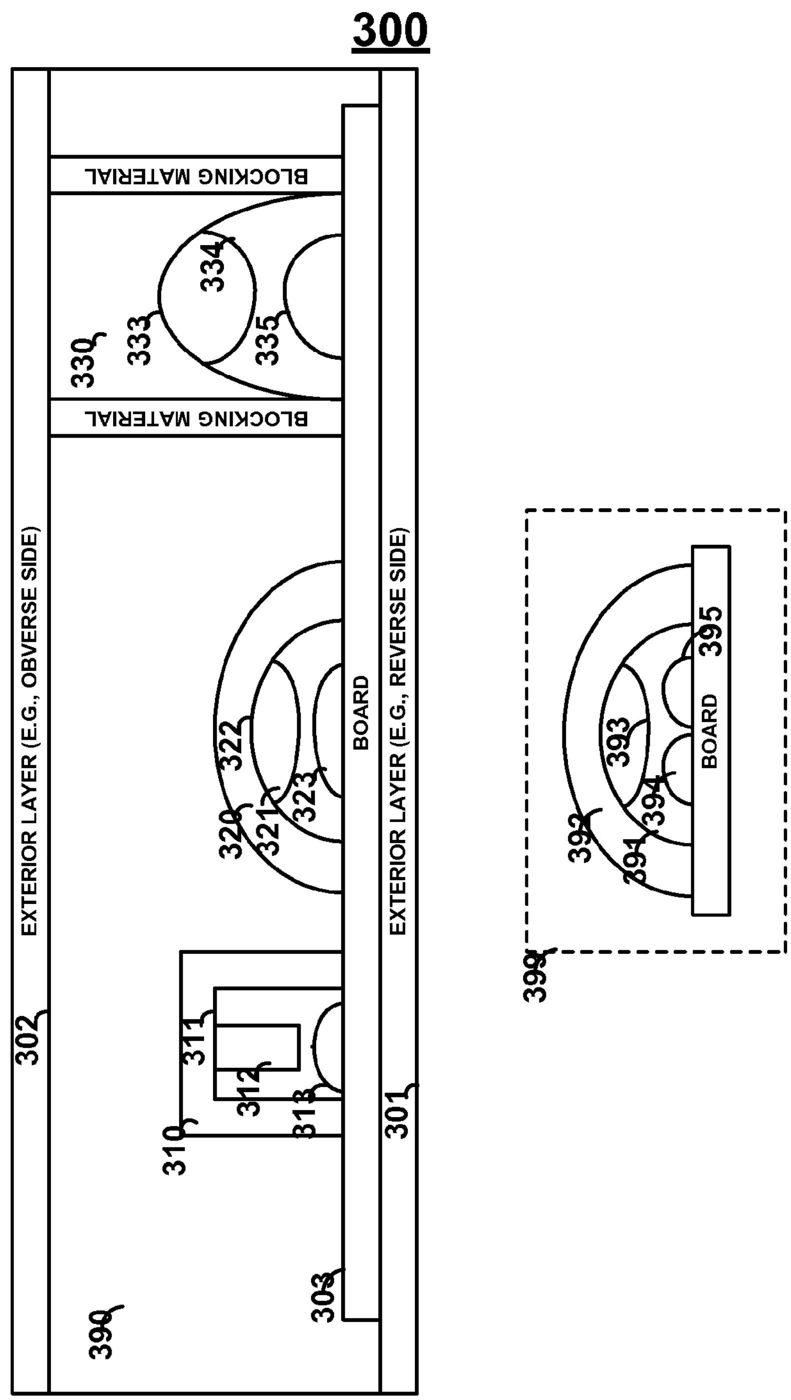
FIG. 3 is an illustration of a card having manual input interfaces constructed in accordance with the principles of the present invention.

FIG. 3 shows cavities 310, 320, and 330 inside of hard laminate 390 and layers 301 and 302. Mechanical switch 311 is provided inside of cavity 310. Mechanical switch 311 may include contact 312 and 313. Accordingly, the closing of mechanical switch 311 may result in contacts 312 and 313 electrically coupling. In turn, for example, a current may flow between contacts 312 and 313 (or a voltage may be held across contacts 312 and 313). Alternatively, for example, any switch may be similar to switch 399, where an electrical signal may communicate between contacts 394 and 395 when bridged by conductive material 393. Such electrical signals may be utilized as control signals (e.g., by a processor). Board 303 may include, for example, the interconnect between components.

Persons skilled in the art will appreciate that a mechanical switch may have several contacts. For example, two contacts may be provided beneath contact 312 in order to increase the sensitivity of mechanical switch 311. Mechanical switch 322 may be provided in cavity 320. Mechanical switch 322 may include one or more contacts 321 and 323. Persons skilled in the art will appreciate that mechanical switches may be provided as dome switches or any other type of switch (e.g., flat membrane switches). Any number of manual input interfaces may be provided on any surface of a card. For example one surface of a card may include five manual input interfaces while another surface of a card may include one manual input interface. Different types of manual input interfaces may be provided on a card. For example, one surface of a card may have one mechanical switch and five capacitive touch sensors. The mechanical switch may be utilized, for example, to begin sensing for manual input from the five capacitive touch sensors. In doing so, for example, power consumption is decreased while sensitivity is increased across the six manual input interfaces. Cavity 330 may be provided by adhering laminate blocking materials to both layers 301 and 302. Such a laminate blocking material may take the form of, for example, a cylinder, cube, or rectangular prism. A laminate blocking material may be adhered to one layer of layers 301 and 302 and still provide a cavity (e.g., the laminate blocking material may be provided as a semi-sphere having a cavity inside. Mechanical switch 333 may be provided and include contacts 334 and 335. Multiple types of manual input interfaces may be provided in a cavity. For example, a capacitive touch sensor may be provided in a cavity. Multiple different manual input interfaces for receiving different manual inputs may be provided in a single cavity (e.g., two mechanical switches may be provided in a cavity).

Figure 4:
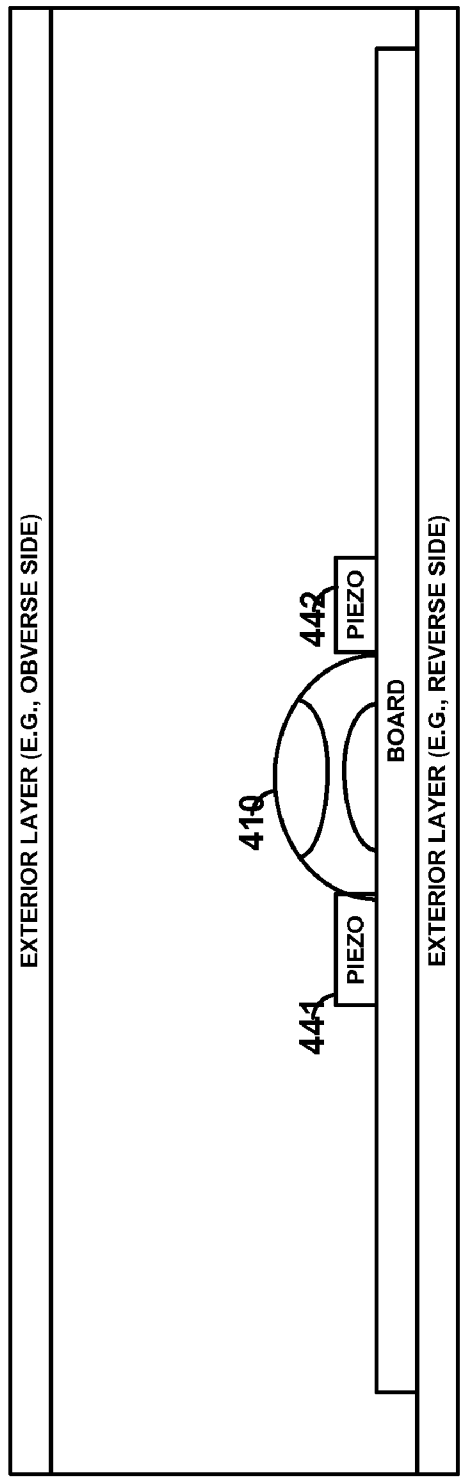
FIG. 4 is an illustration of a card having manual input interfaces with mechanical feedback constructed in accordance with the principles of the present invention.

FIG. 4 shows card 400 that may include, for example, manual interface 410. Persons skilled in the art will appreciate that one or more piezoelectric components (e.g., piezoelectric components 441 and 442) may be positioned around a manual interface. Electrical signals may be applied to components 441 and 442 to cause those components to mechanically distort. Accordingly, components 441 and 442 may be controlled via electrical signals to vibrate. Accordingly, a manual user interface may detect the reception of manual input. This control signal may be forwarded to a processor. In turn, the processor may cause piezoelectric components 441 and 442 to mechanically distort or vibrate. In doing so, a user may receive tactile feedback that manual input was received by a manual input interface. Additionally, for example, a piezoelectric switch may be provided. In this manner, a piezoelectric component may be bent or compressed by a manual input. This compression or bending may cause, for example, the piezoelectric component to produce an electrical signal. The component may be coupled to a processor such that the processor may utilize this signal to determine that the card has received a manual input. Accordingly, the processor may perform a function based on the manual input received. For example, the processor may change the data communicated through a dynamic magnetic stripe communications device as a result of receiving signals from different switches and/or different signals from the same switch.

Persons skilled in the art will appreciate that an injected soft laminate may be hardened in a number of ways. For example, a chemical may be injected with the soft laminate such that the soft laminate hardens in the presence of the chemical. A soft laminate may be hardened, for example, via temperature and/or pressure changes.

Figure 5:
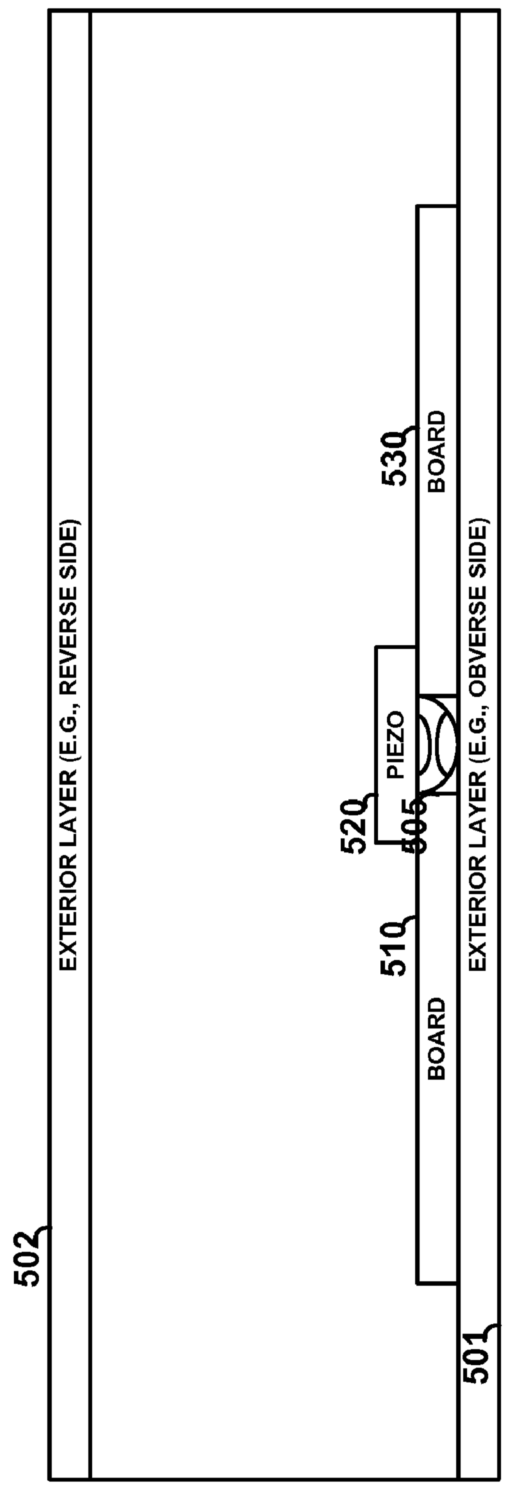
FIG. 5 is an illustration of a card having a manual input interface with mechanical feedback constructed in accordance with the principles of the present invention.

FIG. 5 shows card 500 that may include, for example, polymer layers 501 and 502. Boards 510 and 530 may be provided with manual input interface 505 placed between boards 510 and 530. A board may be provided, for example, in FR4. A board may be non-flexible or flexible and may include interconnections as well as terminals for receiving electrical components. A board, for example, may be a multiple-layer, flexible printed circuit board. A board may be a single layer, flexible circuit board with printing on both sides of the single-layer. Piezoelectric component 520 may be coupled to boards 510 and 530 to receive electrical signals. For example, board 510 may provide a voltage to a contact plate across one side of piezoelectric component 520 and board 530 may provide a different voltage to a different contact plate across another side of piezoelectric component 520. The rigidity differences between board 510, board 530, and piezoelectric component 520 may direct kinetic forces onto manual input interface 505 when layer 501 is pressed in the proximity of manual input interface 505. Piezoelectric component 520 may comprise, for example, one or more layers of piezoelectric materials sandwiched between two layers of conductive material. Piezoelectric component 520 may be, for example, a piezoelectric disk.

Persons skilled in the art will appreciate that the height of card 500, or any card, may be less than approximately 30 to 33 thousandths of an inch (e.g., less than approximately 33 mils). The height of layers 502 and 501 may be less than, for example, approximately 1 to 3 thousandths of an inch (e.g., less than approximately 3 thousandths of an inch).

Figure 6:
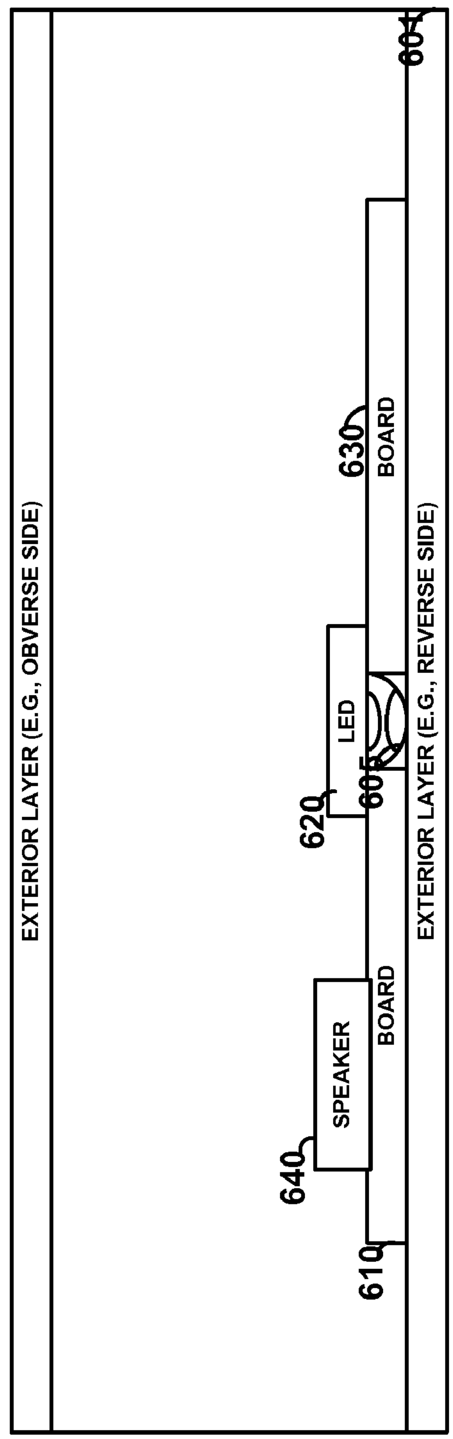
FIG. 6 is an illustration of a card having a manual input interface with optical feedback constructed in accordance with the principles of the present invention.

FIG. 6 shows card 600 that may include layer 601, board 610, board 630, manual input interface 605, light source 620, and speaker 640. A processor detecting a control signal from manual input interface 605 may, for example, cause light source 620 to emit light and/or speaker 640 to emit a sound. Accordingly, audible or visual information may be provided to a user to confirm that a manual input interface has received manual input.

Light source 620 may emit, for example, light constantly or periodically (e.g., light source 620 may blink). Alternatively, for example, light source 620 may emit light constantly for a period of time (e.g., under approximately 15 seconds such as approximately 10 seconds) and then blink for a period of time (e.g. under approximately 20 seconds, such as approximately 10 seconds). In doing so, for example, the amount of power utilized may be decreased. Light source 620 may be, for example, a light emitting diode. A source of electrical energy may be provided in card 600 such as, for example, a battery (e.g., a lithium polymer battery).

Figure 7:
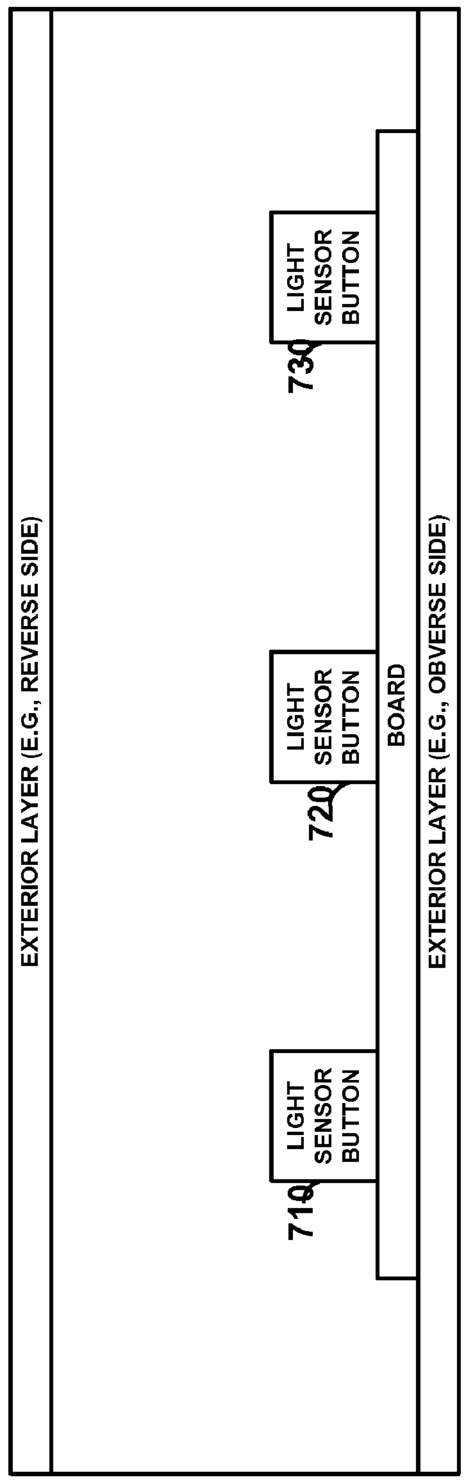
FIG. 7 is an illustration of a card having manual input interfaces including light sensors constructed in accordance with the principles of the present invention.

FIG. 7 shows card 700 that may include light sensors 710, 720, and 730. Light sensors 730 may detect manual input, for example, by detecting the absence of light. For example, light sensors 710, 720, and 730 may each provide a control signal back to a processor indicative of whether the light sensor receives light (or an amount of light). The processor may then determine whether light is sensed (e.g., by comparing an amount of light to a threshold). If, for example, all three buttons sense light, then light sensor may translate one of the buttons losing light (while the other two buttons receiving light) as someone has placed their finger over the light sensor. In doing so, a manual input interface is provided based on light.

Persons skilled in the art will appreciate that components, such as light sensors or light sources, may be electrically coupled to a flexible printed circuit board in a variety of ways. For example, the components may be electrically coupled using surface mount techniques, wire-bonding techniques, and/or flip-chip assembly techniques. Multiple light sensors may be placed within the vicinity of one another to detect the presence of a finger. For example, two light sensors may be placed next to one another. A processor may determine a light button has been activated when, for example, both such light sensors fail to detect light or the amount of light sensed by such light sensors is different, by at least a particular amount, of the light sensed by other light sensors located in the card.

Figure 8:
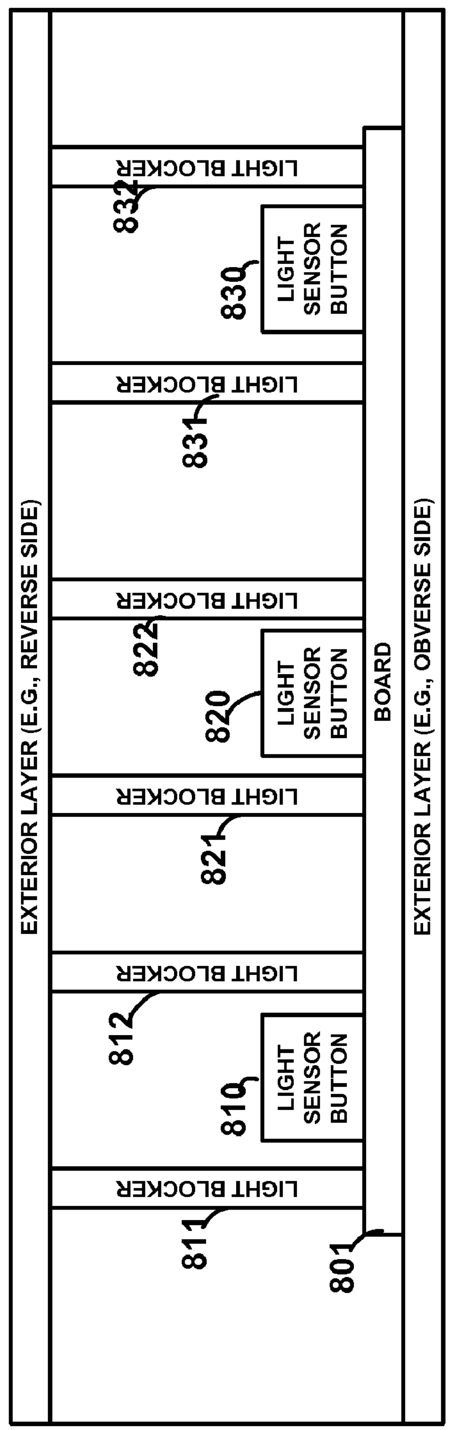
FIG. 8 is an illustration of a card having manual input interfaces including light sensors with light blockers constructed in accordance with the principles of the present invention.

FIG. 8 shows card 800 that may include light sensors 810, 820, and 830. Light blockers 811, 812, 821, 822, 831, and 832 may be provided. Such light blockers may prohibit light from reaching light sensor 820 from particular angles. In doing so, for example, a light sensor may be focused on a particular area of a surface of card 800. Person skilled in the art will appreciate that light sensors and/or light sources may be provided on both sides of board 801. In doing so, for example, a processor may determine the amount of light reaching both sides of card 800. For example, the processor may utilize signals from light sensors to determine when the card is located in an enclosed area (e.g., a wallet) or is sitting against an object (e.g., a table).

Figure 9:
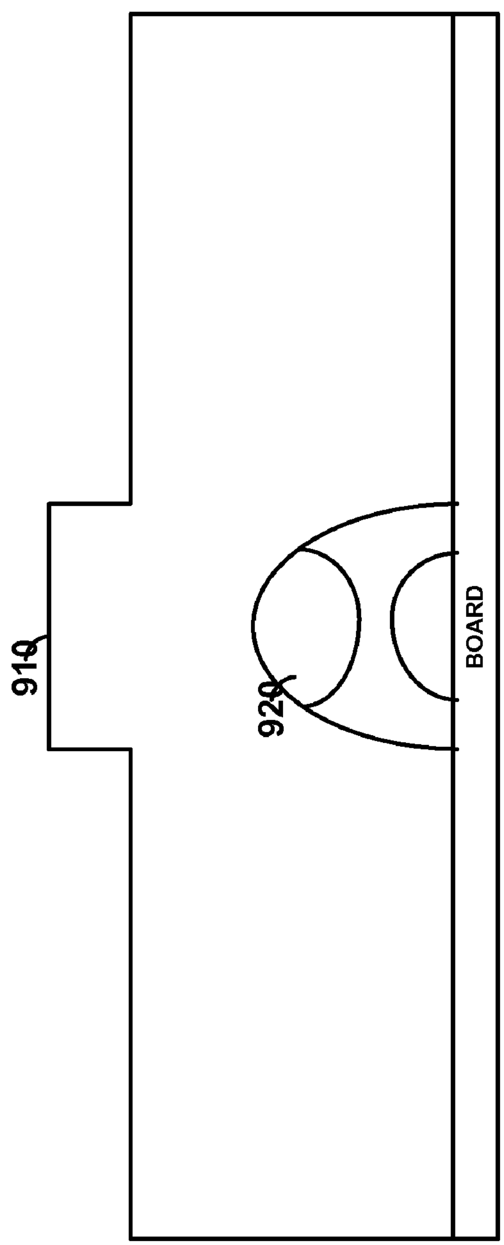
FIG. 9 is an illustration of a card having a manual input interface located under a structural protrusion constructed in accordance with the principles of the present invention.

FIG. 9 shows card 900 that may include protrusion 910 above manual input interface 920. Protrusion 910 may be utilized to direct a person to the place where a manual user interface is located as well as direct force onto manual interface 920. Protrusion 910 may be, for example, molded as part of card 900, pressed into card 900 (e.g., pressed behind manual input interface 920, or cut out of card 900 (e.g., by cutting or laser etching around manual input interface 910). Protrusion 910 may take any shape. For example, protrusion 910 may be circular, rectangular, a square, an oval. The top of protrusion 910 may be flat and may extend from the surface at a card at substantially a 90 degree angle. The topography of protrusion 910, however, may change with respect to height. For example, protrusion 910 may have the shape of a pyramid or dome. The height of protrusion 910 may, for example, extend the height of a card that is approximately between 30 and 33 thousandths of an inch to approximately 34 to 41 thousandths of an inch. Accordingly, the height of protrusion 910 may be between, for example, approximately 1 thousandths of an inch to 11 thousandths of an inch (e.g., less than approximately 4 thousandths of an inch). Protrusion 910 may allow a user, for example, to locate a manual input interface without looking at card 900.

Figure 10:
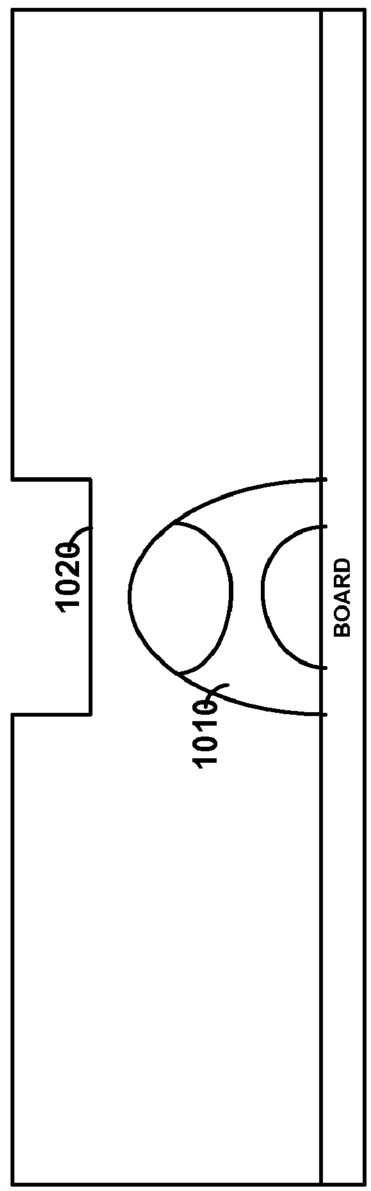
FIG. 10 is an illustration of a card having a manual input interface located under a structural trough constructed in accordance with the principles of the present invention.

FIG. 10 shows card 1000 that may include cavity 1020 above manual input interface 1010. Cavity 1020 may be utilized to direct a person to the place where a manual user interface is located as well as direct force onto manual interface 1010. Cavity 1020 may be, for example, molded as part of card 1000, pressed into card 1000, or cut out of card 1000. Cavity 1020 may take any shape. For example, cavity 1020 may be circular, rectangular, a square, an oval. The bottom of cavity 1020 may be flat and may extend from the surface at a card at substantially a 90 degree angle. The topography of cavity 1020, however, may change with respect to height. For example, cavity 1020 may have the shape of an upside-down pyramid or dome. The height of cavity 1020 may, for example, reduce the height of a card at the cavity to approximately between 30 and 33 thousandths of an inch to approximately 15 to 32 thousandths of an inch. Accordingly, the height of cavity 1020 may be between, for example, approximately 1 thousandths of an inch to 8 thousandths of an inch (e.g., less than approximately 4 thousandths of an inch). Cavity 1020 may allow a user, for example, to locate a manual input interface without looking at card 1000.

Persons skilled in the art will appreciate that a card may have both cavities and protrusions on either, or both, sides of a card. Similarly, for example, manual input interfaces (e.g., mechanical or capacitive button) may be provided on either, or both, sides of a card (or other device). For example, buttons with cavities may be placed on one side of a card while buttons with protrusions may be placed on the other side of the card. As per one example, particular buttons on one side of a card may be aligned with protrusions while other particular buttons on that same side of the card may be aligned with cavities. For example, a button that turns a card ON and OFF may have a protrusion while other buttons for receiving manual input indicative of information may have cavities. Similarly, a button may be provided with no cavity or protrusion such that the surface of a card over a button lies flat with respect to the rest of that surface of the card. Persons skilled in the art will appreciate that a card or other device may be provided that is flexible that includes a flexible electronic board, electronic components, flexible buttons, flexible polymer layers, and flexible other laminates. Indicia (e.g., letters, words, logos, pictures) may be provided on either side of a card, on the top surface of a protrusion, or the button of a cavity. Such indicia may be, for example, printed, laser engraved, or embossed. Persons skilled in the art will appreciate that a card may be a credit, debit, pre-paid, or gift card. A customer's name and payment card number may be provided as indicia on a card (e.g., on an obverse side of a card). Magnetic stripe data associated with the customer (e.g., a payment card number and associated discretionary data) may be communicated from a dynamic magnetic stripe communications device, RFID, and/or IC chip that may be exposed on the surface of a card. Such printing, laser engraving, and/or embossing may be provided, for example, after a soft laminate utilized to form a card hardens. A dome switch may be directly connected to a processor. Additional circuitry may be provided between a dome switch and a processor.

Figure 11:
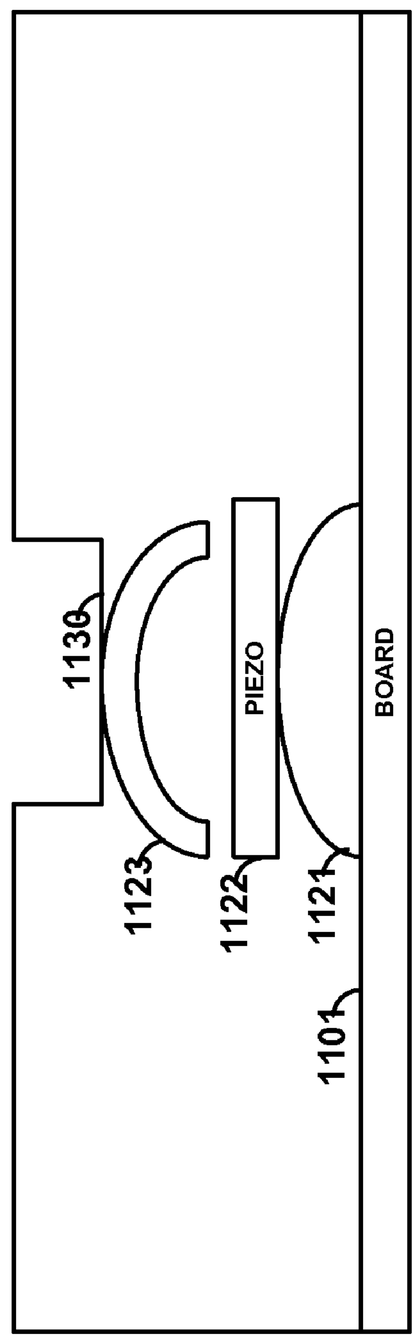
FIG. 11 is an illustration of a card having a piezoelectric based switch constructed in accordance with the principles of the present invention.

FIG. 11 shows card 1100 that may include, for example, cavity 1130, piezoelectronic component 1122, board 1101, bending structure 1121, and bending structure 1123. Bending structures 1123 and 1121 may be utilized, for example, to assist piezoelectronic component 1122 to be pressed at a preferred angle. Persons skilled in the art will appreciate that a piezoelectronic component may be configured to produce an electrical signal when compressed or may be configured to produce an electrical signal when bent. Accordingly, structures may be added to assist in compressing or bending one or more piezoelectric components in particular ways when forces are provided on particular areas of a card.

Persons skilled in the art will also appreciate that the present invention is not limited to only the embodiments described. Instead, the present invention more generally involves dynamic information and manual interfaces in devices and laminated cards. Persons skilled in the art will also appreciate that the apparatus of the present invention may be implemented in other ways then those described herein. All such modifications are within the scope of the present invention, which is limited only by the claims that follow.

What is claimed is:

1. A payment card comprising:

a first layer of polymer;

a second layer of polymer;

a material adhered to said first layer and second layer, wherein a cavity is provided by said adhered material and a mechanical switch is provided in said cavity; and a hardened material located between said first layer and second layer, wherein said hardened material hardened while being located between said first layer and said second layer.

2. The payment card of claim 1, wherein said cavity is the shape of a dome.

3. The payment card of claim 1, wherein personal payment card information is printed on the exterior of said first layer of polymer.

4. The payment card of claim 1, further comprising a processor and a dynamic magnetic stripe communications device.

5. The payment card of claim 1, further comprising an IC chip, wherein a surface of said IC chip is exposed and aligned with the surface of said first layer.

6. The payment card of claim 1, further comprising an RFID.

7. A payment card comprising:

a first layer of polymer;

a second layer of polymer;

a laminate located between said first layer and said second layer;

a cavity formed in said laminate, wherein a mechanical dome switch is provided in said cavity; and a processor, wherein said processor is electrically coupled with said dome switch.

8. The payment card of claim 7, further comprising a capacitive touch sensor coupled to said processor.

9. The payment card of claim 7, wherein said dome switch is coupled to a flexible printed circuit board.

10. The payment card of claim 7, wherein said dome switch is coupled to a multiple-layer flexible printed circuit board.

11. The payment card of claim 7, further comprising a dynamic magnetic stripe communications device.

12. The payment card of claim 7, further comprising a protrusion, wherein said protrusion is aligned with said dome switch.

13. The payment card of claim 7, further comprising a cavity, wherein said cavity is aligned with said dome switch.

14. A method of fabricating a card comprising:

providing a first layer of polymer;

providing a second layer of polymer:

providing a flexible printed circuit board on said second layer;

injecting a laminate in liquid form between said first and second layers; and hardening said laminate, wherein a cavity is provided in said hardened laminate and a dome switch is located in said cavity.

15. The method of claim 14, further comprising printing personal information on the exterior of said first layer of polymer after said liquid laminate hardens.

16. The method of claim 14, further comprising laser engraving personal information on the exterior of said first layer of polymer after said liquid laminate hardens.

17. The method of claim 14, wherein said liquid laminate hardens at least in part due to heat.

18. The method of claim 14, wherein said liquid laminate hardens at least in part due to pressure.

19. The method of claim 14, wherein said liquid laminate hardens at least in part due to a substance.

20. The method of claim 14, wherein said dome switch is electrically coupled to a processor.

* * * * *